United States Patent
Meng et al.

(10) Patent No.: US 12,143,242 B2
(45) Date of Patent: *Nov. 12, 2024

(54) DYNAMIC ESTABLISHMENT AND TERMINATION OF VPN TUNNELS BETWEEN SPOKES

(71) Applicant: Palo Alto Networks, Inc., Santa Clara, CA (US)

(72) Inventors: Li Meng, Saratoga, CA (US); Dhwanit Shah, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,556

(22) Filed: Dec. 20, 2022

(65) Prior Publication Data

US 2023/0119242 A1    Apr. 20, 2023

Related U.S. Application Data

(63) Continuation of application No. 16/528,229, filed on Jul. 31, 2019, now Pat. No. 11,563,600.

(51) Int. Cl.
*H04L 12/46* (2006.01)
*H04L 9/40* (2022.01)
*H04L 12/66* (2006.01)

(52) U.S. Cl.
CPC ...... *H04L 12/4633* (2013.01); *H04L 12/4641* (2013.01); *H04L 12/66* (2013.01); *H04L 63/0272* (2013.01)

(58) Field of Classification Search
CPC . H04L 12/4633; H04L 12/4641; H04L 12/66; H04L 63/0272

USPC ........................................................ 709/227
See application file for complete search history.

(56) References Cited

U.S. PATENT DOCUMENTS

| 7,447,901 | B1 | 11/2008 | Sullenberger et al. |
| 7,801,030 | B1 | 9/2010 | Aggarwal et al. |
| 7,848,335 | B1 * | 12/2010 | Kang ................ H04L 63/0272 370/409 |
| 7,869,446 | B2 | 1/2011 | Khalid et al. |

(Continued)

FOREIGN PATENT DOCUMENTS

CN    101009629 A    8/2007

*Primary Examiner* — Wing F Chan
*Assistant Examiner* — John Fan
(74) *Attorney, Agent, or Firm* — Gilliam IP PLLC

(57) ABSTRACT

To reduce overhead generated by maintaining a full mesh network with static spoke-to-spoke tunnels while providing the efficiency of spoke-to-spoke communication, BGP configuration is automated to provide for dynamic establishment of spoke-to-spoke tunnels. A virtual Internet Protocol (VIP) address is assigned to each spoke in the network. Spokes advertises their VIP address to the hub for communication to the other spokes. A spoke sets the route next hop in its routing table for a remote spoke to the VIP of the remote spoke. Establishment of a tunnel between spokes is initiated after detecting data is to be communicated between the spokes while data is temporarily routed through the hub. Data is routed directly to the receiving spoke through the dynamic tunnel once the tunnel is active. Tunnels between spokes are terminated dynamically after a period of inactivity to reduce overhead caused by consistent maintenance of dynamic tunnels with low use.

20 Claims, 6 Drawing Sheets

(56) References Cited

U.S. PATENT DOCUMENTS

| | | |
|---|---|---|
| 7,975,030 B2 | 7/2011 | Saeed et al. |
| 10,341,140 B2 * | 7/2019 | Shen .................. H04L 12/4633 |
| 11,336,482 B2 * | 5/2022 | Ramamoorthi ....... H04L 41/122 |
| 2007/0206597 A1 | 9/2007 | Asati et al. |
| 2008/0195733 A1 | 8/2008 | Detienne et al. |
| 2008/0201486 A1 * | 8/2008 | Hsu ........................ H04L 67/06 |
| | | 709/238 |
| 2009/0097417 A1 * | 4/2009 | Asati ...................... H04L 45/17 |
| | | 370/255 |
| 2009/0157901 A1 | 6/2009 | Asati et al. |
| 2017/0126626 A1 * | 5/2017 | Datta .................. H04L 63/0272 |
| 2017/0180155 A1 | 6/2017 | Shanks et al. |
| 2017/0230198 A1 * | 8/2017 | Xu ......................... H04L 45/04 |

* cited by examiner

DYNAMIC ESTABLISHMENT AND TERMINATION OF VPN TUNNELS BETWEEN SPOKES

BACKGROUND

The disclosure generally relates to the field of information security, and to multicomputer data transferring.

A hub-and-spoke network is defined by one site acting as a hub through which other sites, or spokes, are connected. Traffic between spokes in a hub-and-spoke network is communicated through the hub. To ensure secure transmission of data in a hub-and-spoke network, a virtual private network (VPN) can be established such that traffic between entities is encrypted and securely routed through VPN tunnels. One routing protocol used for routing traffic between entities in a hub-and-spoke network configuration is the Border Gateway Protocol (BGP). BGP may be used for routing between different autonomous systems (ASs), in which the hub and each spoke correspond to different ASs, or within the same AS, in which the hub and each spoke correspond to different network components in the same AS. In networks using BGP as the routing protocol, routing information is exchanged between entities which have established a connection for exchanging data, or BGP peers. For instance, in a hub-and-spoke network, BGP peering is established between each hub-spoke pairing. A VPN tunnel can then be established between the hub and spoke which are connected as BGP peers.

BRIEF DESCRIPTION OF THE DRAWINGS

Embodiments of the disclosure may be better understood by referencing the accompanying drawings.

DESCRIPTION

Figure 1:
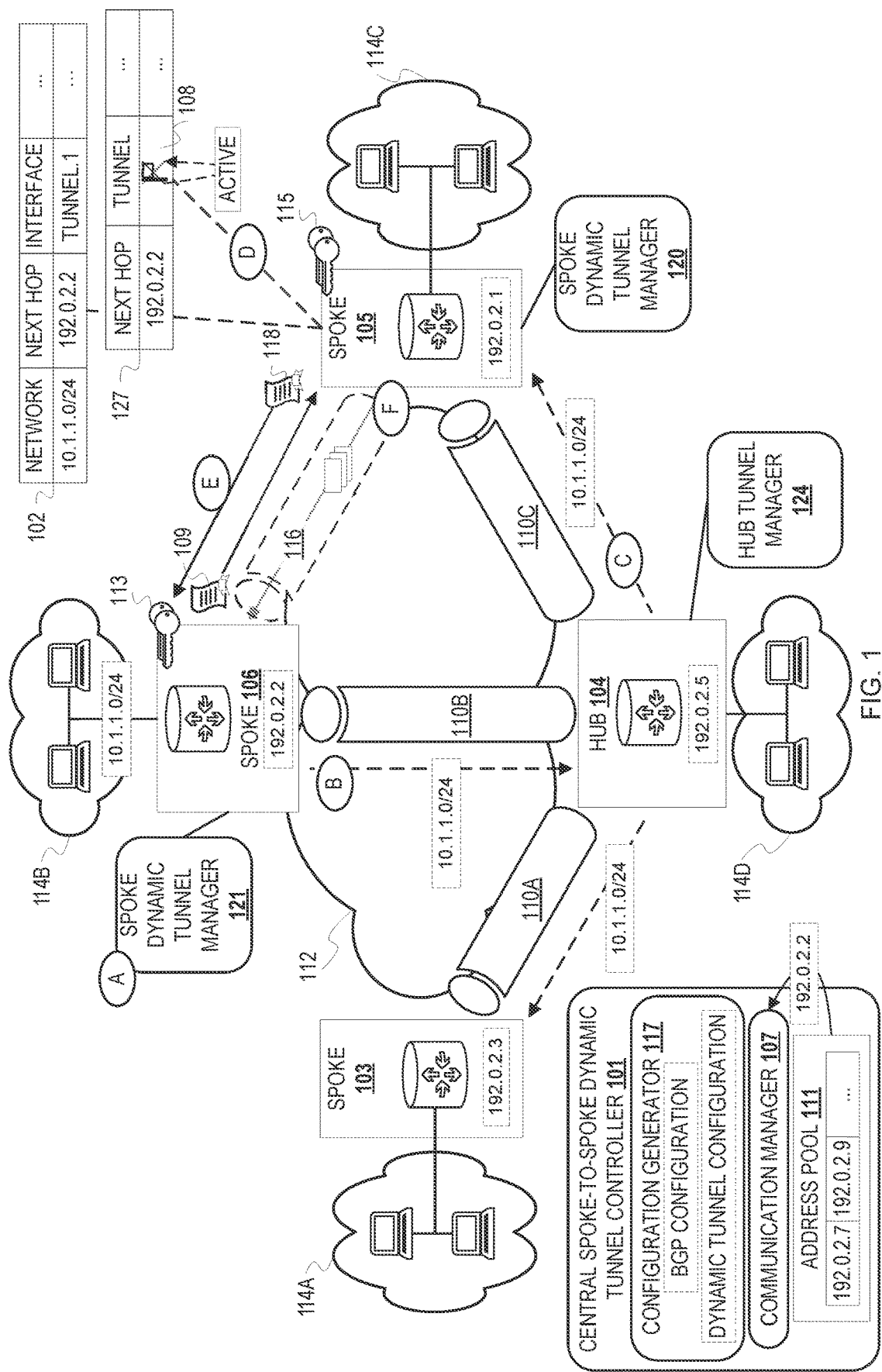
FIG. 1 depicts an example conceptual diagram of dynamic establishment of spoke-to-spoke VPN tunnels in a hub-and-spoke network.

The description that follows includes example systems, methods, techniques, and program flows that embody aspects of the disclosure. However, it is understood that this disclosure may be practiced without these specific details. For instance, this disclosure refers to the Internet Protocol security (IPsec) protocol for VPN tunnels in illustrative examples. Aspects of this disclosure can be instead applied to any other protocol to establish a VPN connection, such as the Secure Shell (SSH) protocol. In other instances, well-known instruction instances, protocols, structures and techniques have not been shown in detail in order not to obfuscate the description.

INTRODUCTION

Though hub-and-spoke deployments may be used in a distributed enterprise, consistently directing network traffic destined for a spoke through the hub rather than routing traffic directly to the destination spoke can lack efficiency. BGP can be manually configured to facilitate direct spoke-to-spoke communication in such deployments by establishing static tunnels between spokes. Establishing tunnels directly between spokes achieves the capabilities of a full mesh network by allowing traffic to be routed between spokes in the network. However, maintaining a full mesh of static spoke-to-spoke tunnels generates considerable overhead, particularly due to maintaining tunnels between spokes which may be infrequently used.

Overview

To reduce the overhead generated by maintaining a full mesh network with static spoke-to-spoke VPN tunnels while providing the efficiency of direct spoke-to-spoke communication, BGP configuration is automated to provide for dynamic establishment of spoke-to-spoke VPN tunnels. A central controller (or "controller") assigns a virtual Internet Protocol (VIP) address to each spoke in the network as spokes register with the controller. Each spoke advertises its dynamically allocated VIP address to the hub which the hub communicates to the other spokes. A spoke can then set the route next hop in its routing table for a remote spoke to the VIP of the remote spoke itself rather than the Internet Protocol (IP) address of the hub to facilitate data exchange directly with the remote spoke. Establishment of a VPN tunnel between spokes is initiated based on detecting that network traffic is to be communicated between the spokes. To prevent loss of data transmitted to the receiving spoke during the VPN tunnel establishment, network traffic is temporarily routed through the hub. Network traffic is routed directly to the receiving spoke through the dynamically provisioned VPN tunnel once the tunnel has been indicated as active. Termination of VPN tunnels between spokes also occurs dynamically. By monitoring traffic exchanged between two spokes, VPN tunnels can be terminated after observing a period of tunnel inactivity. Dynamic teardown of tunnels based on inactivity timeout reduces overhead caused by consistent maintenance of VPN tunnels between spokes which exchange data infrequently.

Example Illustrations

FIG. 1 depicts an example conceptual diagram of dynamic establishment of spoke-to-spoke VPN tunnels in a hub-and-spoke network. Hub-and-spoke networks comprise at least one hub network device (hereinafter a "hub") and spoke network devices (hereinafter "spokes") arranged such that data communicated between spokes can flow through the hub. FIG. 1 depicts a hub-and-spoke network comprising a spoke 103, a spoke 105, a spoke 106, and a hub 104 which correspond to separate autonomous systems, though the hub 104 and spokes 103, 105, 106 may belong to one autonomous system. While depicted as routers in FIG. 1, each of the spoke 103, spoke 105, spoke 106, and hub 104 can be any network device with at least layer 3 (i.e., network layer) networking capabilities. For example, the spokes 103, 105, 106 and hub 104 can be routers, switches, and/or firewalls. The spokes 103, 105, 106 and the hub 104 communicate with a central spoke-to-spoke dynamic tunnel controller ("central controller") 101. The central controller 101 generates BGP configuration information and communicates with the hub 104 and spokes 103, 105, 106. The central controller 101 is depicted as one entity (e.g., a server, a cloud service, or firewall), although the functionality of the central controller 101 can be allocated across multiple entities. For example, generation of BGP information and communication with the spokes 103, 105, 106 and the hub 104 can be performed by one entity (i.e., the central controller 101) or different coupled entities (e.g., two firewalls, one server and one firewall, etc.). The spokes 103, 106, 105 manage incoming and outgoing network traffic for private networks 114A, 114B, 114C, respectively. The hub 104 manages incoming and outgoing network traffic for a private network 114D. A VPN tunnel 110A is established between the spoke 103 and the hub 104. A VPN tunnel 110B is established between the spoke 106 and the hub 104. A VPN tunnel 110C is established between the spoke 105 and the hub 104. The VPN tunnels 110A-C are static VPN tunnels for secure communication of data between the hub 104 and spokes 103, 105, 106 over a public network 112. The VPN tunnels 110A-C may use any VPN protocol providing for encryption, such as Internet Protocol Security (IPsec).

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the spoke 106 registers with the central controller 101. The spokes 103, 105 are already registered with the central controller 101 and have installed a BGP configuration generated by a configuration generator 117 of the central controller 101. The spoke 103 and spoke 105 are BGP peers of the hub 104 as indicated by the BGP configuration. Once the spoke 106 is activated, a spoke dynamic tunnel manager 121 of the spoke 106 establishes a secure connection with the central controller 101 and communicates a request or command to the central controller 101 for retrieval of a BGP configuration over the secure connection. The spoke dynamic tunnel manager 121 may be, for example, a process, daemon, etc. which executes at the spoke 106. The dynamic tunnel manager 121 additionally indicates the public IP address of the spoke 106 to the central controller 101. The configuration generator 117 pushes a BGP configuration to the spoke 106 via a communication manager 107 and allocates a VIP address from an address pool 111 to be assigned to the spoke 106. In this example, the communication manager 107 assigns a VIP address 192.0.2.2 from the address pool 111 to the spoke 106. The BGP configuration at least indicates configuration of the hub 104 and spoke 106 as BGP peers. The configuration generator 117 also can generate a dynamic tunnel configuration which indicates a dynamic VPN tunnel inactivity timeout period. The configuration generator 117 can push the dynamic tunnel configuration to the spoke 106 via the communication manager 107 in addition to the BGP configuration. Following registration of the spoke 106 with the central controller 101, the dynamic tunnel manager 121 may periodically "refresh" the secure connection which was initially established with the central controller 101, such as by updating a Secure Sockets Layer (SSL) certificate. The configuration generator 117 may push the dynamic tunnel configuration to the spoke 106 via the communication manager 107 again after these periodic refreshments of the secure connection.

After the spoke 106 has registered with the central controller 101, the communication manager 107 sends the VIP address and public IP address of the spoke 106 to the hub 104 and the spokes 103, 105. The communication manager 107 also sends the VIP addresses and public IP addresses of the spokes 103, 105 and the hub 104 to the spoke 106. A spoke dynamic tunnel manager 120 of the spoke 105 and a hub tunnel manager 124 of the hub 104 can add the VIP and public IP addresses of the spoke 106 to a record of VIP and public IP addresses of network devices registered with the central controller 101 which is maintained by each of the spoke 105 and the hub 104. Each of the spoke dynamic tunnel manager 120 and the hub tunnel manager 124 may be, for example, a process, daemon, etc. which executes at the spoke 105 and the hub 104, respectively. The hub tunnel manager 124 replaces a placeholder peer address for the spoke 106 established in a BGP configuration installed to the hub 104 with the VIP address of the spoke 106. Similarly, the spoke dynamic tunnel manager 121 can add the VIP and public IP addresses of the spokes 103, 105 and the hub 104 to a record of VIP and public IP addresses of network devices registered with the central controller which is maintained by the spoke 106. Routing engines of the spokes 103, 105 also install a static route to reach the spoke 106 to an entry in a respective routing table maintained for the spokes 103, 105. The entry may indicate the static route, the VIP address of the spoke 106, and an outgoing tunnel interface (e.g., an interface for transmission of outgoing network traffic via a VPN tunnel). The static route can be a host route or an aggregate route. Adding the static route to the routing tables of the spokes 103, 105 allows the spokes 103, 105 to install routes advertised by the spoke 106 and resolve the next hop for the routes to the spoke 106 using BGP.

At stage B, a routing engine of the spoke 106 advertises to the hub 104 a route by which the spoke 106 can be reached and indicates the VIP address of the spoke 106 as the route next hop. Route advertisement may be prompted by changes in topology of the hub-and-spoke network, such as due to completion of registration of the spoke 106 with the central controller 101. In this example, the spoke 106 routing engine advertises the route 10.1.1.0/24 corresponding to the private network 114B to the hub 104. The spoke 106 routing engine advertises the route to the hub 104 in accordance with the BGP. The spoke 106 routing engine advertises the route by sending a message to the hub 104, such as a BGP update message. The BGP update message indicates network layer reachability information (NLRI) of the route 10.1.1.0/24 for the spoke 106 (i.e., the IP address prefix of the route and a length of the IP address prefix). The BGP update message can also include the VIP address 192.0.2.2 of the spoke 106 as a path attribute.

At stage C, a routing engine of the hub 104 advertises the route advertised by the spoke 106 to the spokes 103, 105. The hub 104 routing engine can send the route to the spokes 103, 105 by sending a BGP message to each of the spokes 103, 105. For instance, the hub 104 routing engine can generate and send a BGP update message to each of the spokes 103, 105. The BGP update message communicated from the hub 104 routing engine may indicate the NLRI of the route which was included in the BGP update message received from the spoke 106. The BGP update message can also include a path attribute indicating the VIP address of the advertising spoke, or the spoke 106. For example, the BGP update message may include the IP address prefix of the route, the length of the IP address prefix, and a next hop path attribute indicating the VIP address 192.0.2.2 of the advertising spoke as the route next hop.

At stage D, a routing engine of the spoke 105 installs the route advertised by the spoke 106 to its routing table 102. The installation adds the IP address prefix to the routing table 102 and establishes the next hop as the VIP address of the spoke 106. For instance, after installation of the route to the routing table 102, the entry in the routing table 102 can indicate the IP address prefix 10.1.1.0/24 as the destination network and the VIP address 192.0.2.2 as the route next hop. The routing table 102 can also indicate an outgoing interface for the route with the VIP address 192.0.2.2 as the route next hop (e.g., TUNNEL.1). Rather than setting the VIP address of the hub 104 as the route next hop to reach the spoke 106, the spoke 105 routing engine updates the routing table 102 with the VIP address of the advertising spoke 106 as the route next hop. Though FIG. 1 depicts the spoke 105 routing engine as installing the advertised route to its routing table, each spoke to which the hub 104 advertised the route can install the advertised route to its respective routing table. For instance, a routing engine of the spoke 103 can install the route 10.1.1.0/24 to its routing table.

At stage E, the spoke dynamic tunnel manager 120 detects that outgoing data (e.g., network packets) are destined for a destination IP address corresponding to the private network 114B and initiates setup of a dynamic tunnel between the spoke 105 and the spoke 106. For example, the spoke dynamic tunnel manager 120 can determine that network packets indicate a destination IP address of 10.1.1.10. The spoke dynamic tunnel manager 120 performs a route lookup for the destination IP address 10.1.1.10 and identifies the private network 114B with the route 10.1.1.0/24 as the destination network and the VIP address of the spoke 106 as the route next hop. The spoke dynamic tunnel manager 120 can also determine the outgoing interface (e.g., TUNNEL.1) based on the route lookup. The spoke dynamic tunnel manager 120 identifies the tunnel which uses the outgoing interface indicated in the routing table 102 through which the network packets should be sent. For instance, a static tunnel and a dynamic tunnel can both use the outgoing interface TUNNEL.1. The spoke dynamic tunnel manager 120 determines if the network packets should initially be sent through the static tunnel or the dynamic tunnel based on determining if a dynamic tunnel is active.

The spoke dynamic tunnel manager maintains a dynamic tunnel table 127 which stores information for dynamic tunnels between spokes, including an inactivity flag 108 which indicates that a dynamic tunnel to reach the route next hop is inactive. The dynamic tunnel table 127 can be any data structure capable of storing information related to dynamic tunnel maintenance for a network device (e.g., a list, hash table, etc.). The spoke dynamic tunnel manager 120 searches the dynamic tunnel table 127 for an entry corresponding to the next hop VIP address of the spoke 106. The spoke dynamic tunnel manager 120 determines that the inactivity flag 108 is set for the next hop VIP address of the spoke 106, which triggers initiation of dynamic tunnel setup. Detection of the outgoing data which is destined for a network to which a dynamic tunnel is not active prompts the dynamic tunnel manager 120 to initiate dynamic tunnel setup without necessitating additional communication with the hub 104 to request confirmation of initiation of dynamic tunnel setup (e.g., via a notification received from the hub 104).

The outgoing packets are temporarily routed to the spoke 106 through the static tunnels 110B and 110C via the hub 104. The spoke dynamic tunnel managers 120, 121 can maintain a hub VIP address in addition to the route next hop corresponding to a spoke to facilitate temporary direction of traffic through the static tunnels 110A-C which act as a secondary communication channel during dynamic tunnel setup. The hub VIP address may be the VIP address of a best hub for the route, or the hub along the route for which the number of hops to reach the destination is the shortest when network traffic is routed through that hub. Network traffic can be directed between the spokes 105, 106 via the hub because the hub 104 has established a BGP peer relationship with the spokes 105, 106. For instance, the spoke dynamic tunnel manager 120 may maintain the VIP address 192.0.2.5 of the hub 104 as the best hub for the destination network 10.1.1.0/24. The spoke dynamic tunnel manager 120 performs a tunnel lookup for the hub 104 based on the VIP address 192.0.2.5 to identify the static tunnel 110C. The spoke dynamic tunnel manager 120 can then direct network packets to the hub 104 through the static tunnel 110C. Temporary routing of network traffic between spokes through the static VPN tunnels 110A-C via the hub 104 during setup of a dynamic tunnel prevents data loss and delay in data transmission that may otherwise result from tunnel switching.

To establish secure communication between the spoke 105 and the spoke 106, the spoke 105 and the spoke 106 authenticate with an Internet Key Exchange (IKE) process. To establish a security association with IKE, the spoke 105 authenticates with the spoke 106 (e.g., with certificate- or password-based authentication). In this example, the spoke 105 and spoke 106 have been issued a Public Key Infrastructure (PKI) certificate 118 and PKI certificate 109, respectively. The central controller 101 may act as a certificate authority which generates and issues the PKI certificate 118, to the spoke 105 and the PKI certificate 109 to the spoke 106. The spokes 105, 106 also have respective public keys 115, 113. The spoke 105 and the spoke 106 authenticate with the PKI certificates 118, 109. The spoke dynamic tunnel manager 120 of the spoke 105 and spoke dynamic tunnel manager 121 of the spoke 106 each generate a private key and complete a key exchange to exchange public keys 113, 115 between the spokes 105, 106. After exchanging the public keys 113, 115, the spoke dynamic tunnel managers 120, 121 can generate shared secret keys and establish a secure channel between the spokes 105, 106. The spoke dynamic tunnel managers 120, 121 can then negotiate a dynamic tunnel (e.g., an IPsec VPN tunnel) for secure communication between the spokes 105, 106. For instance, the spoke dynamic tunnel managers 120, 121 can negotiate a dynamic tunnel by leveraging the shared secret keys.

At stage F, upon completion of the dynamic tunnel negotiation, a dynamic tunnel 116 is established between the spoke 105 and the spoke 106. The dynamic tunnel 116 is a VPN tunnel which facilitates secure transmission of data over the public network 112 and may leverage encryption. Once the dynamic tunnel 116 has been established, the spoke dynamic tunnel managers 120, 121 redirect data flow between the spoke 105 and the spoke 106 through the dynamic tunnel 116 such that data no longer flows through the static tunnels 110B and 110C via the hub 104.

The spoke dynamic tunnel manager 120 removes the inactivity flag 108 in the entry for the route next hop corresponding to the spoke 106 in the dynamic tunnel table 127. With the removal of the inactivity flag 108, upon subsequent lookups on the dynamic tunnel table 127 for the spoke 106 next hop, the spoke dynamic tunnel manager 120 can determine that the dynamic tunnel 116 is established and active for the route to the destination network 10.1.1.0/24 with the VIP address of the spoke 106 as the next hop. Network packets can be routed directly between the spoke 105 and the spoke 106 through the dynamic tunnel 116 as long as the dynamic tunnel 116 is established. For instance, upon subsequent detection of network packets to be sent from the spoke 105 to the spoke 106, the spoke dynamic tunnel manager 120 can check the routing table 102 and the dynamic tunnel table 127 to determine that a dynamic tunnel has been established for the route 10.1.1.0/24 with the VIP address 192.0.2.2 of the spoke 106 as the route next hop and can direct the network packets directly to the spoke 106 over the dynamic tunnel 116.

Figure 2:
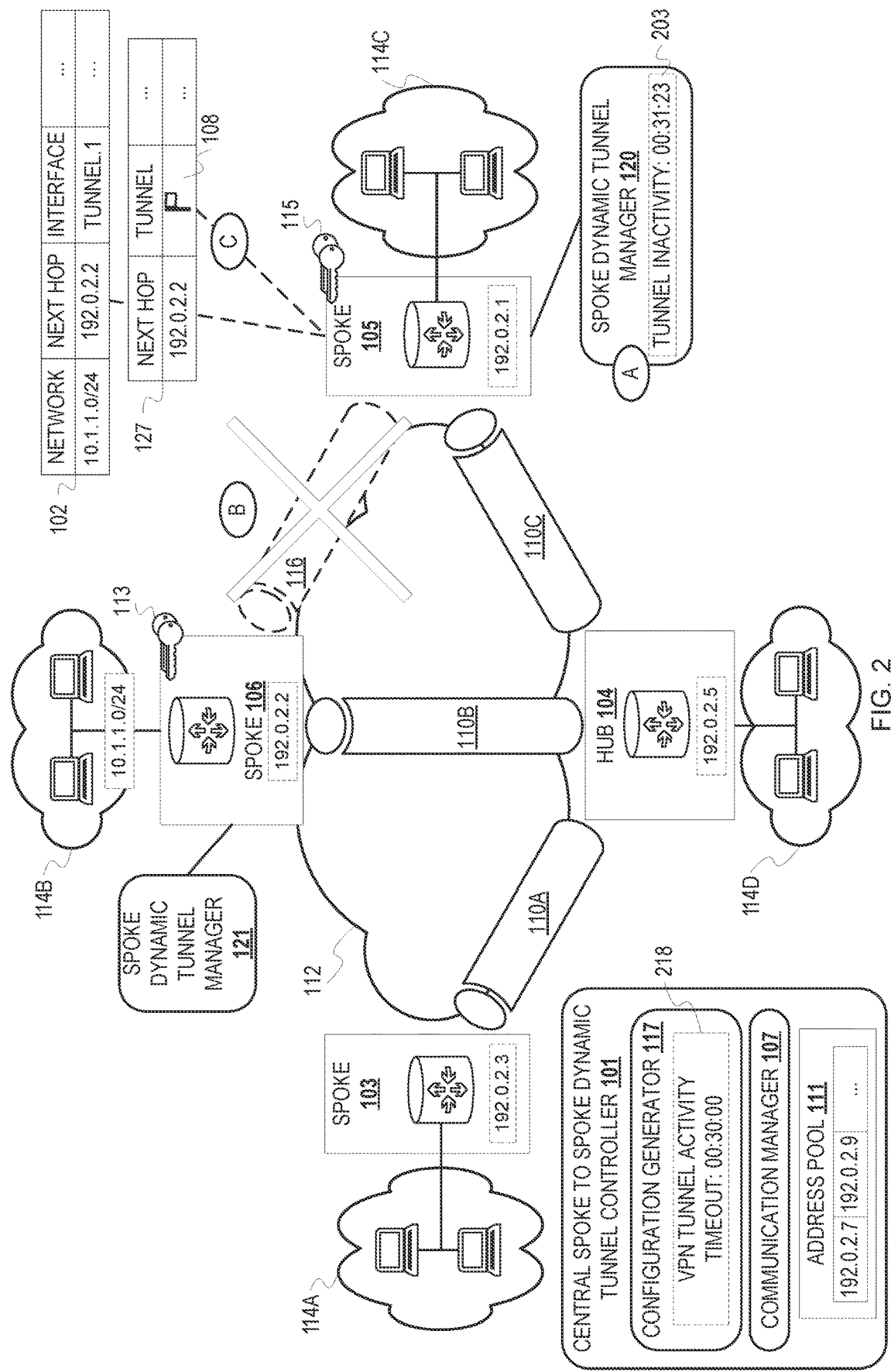
FIG. 2 depicts an example conceptual diagram of dynamic termination of spoke-to-spoke VPN tunnels.

FIG. 2 depicts an example conceptual diagram of dynamic termination of spoke-to-spoke VPN tunnels. A dynamic tunnel 116 to facilitate flow of network traffic directly between spokes 105, 106 has been established as described in FIG. 1. In this example, a dynamic tunnel configuration 218 with which each of the spokes 103, 105, 106 are configured indicates a timeout period for dynamically established VPN tunnels between spokes. The timeout period is a configurable threshold period of tunnel inactivity which the configuration generator 117 can set. Enforcement of a timeout period for dynamically established VPN tunnels prevents incurrence of overhead caused by maintaining dynamic tunnels between spokes which experience low network traffic due to infrequent use. In this example, the timeout period indicated by the dynamic tunnel configuration 218 is thirty minutes, though the configuration generator 117 can set any value as the timeout period (e.g., one hour, one day, etc.).

FIG. 2 is annotated with a series of letters A-C. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the spoke dynamic tunnel manager 120 monitors activity of the dynamic tunnel 116. The spoke dynamic tunnel manager 120 monitors incoming network traffic sent over the dynamic tunnel 116 from the spoke 106 and outgoing network traffic to be communicated to the spoke 106 through the dynamic tunnel 116. For instance, the spoke dynamic tunnel manager 120 may maintain a packet counter or a timestamp for the dynamic tunnel 116 which indicates the time of the last sent or received network packet to facilitate recording when data was sent between the spokes 105, 106 through the dynamic tunnel 116. The spoke dynamic tunnel manager 120 determines a period of tunnel inactivity 203. Internally generated ping packets can be sent between the spoke dynamic tunnel managers 120, 121 to check liveliness of the dynamic tunnel 116. The spoke dynamic tunnel managers 120, 121 can be configured to recognize these internally generated ping packets such that ping packets communicated between the spokes 105, 106 through the dynamic tunnel 116 are not counted for purposes of determining tunnel activity. A period of tunnel inactivity 203 may be determined based on the elapsed time since routing of the last incoming or outgoing network packet through the dynamic tunnel 116. In this example, the spoke dynamic tunnel manager 120 determines that excluding any ping packets, no network traffic has been sent through the dynamic tunnel 116 in 31 minutes and 23 seconds.

At stage B, the spoke dynamic tunnel manager 120 initiates teardown of the dynamic tunnel 116. The spoke dynamic tunnel manager 120 initiates teardown of the dynamic tunnel 116 based on determining that the period of inactivity of the dynamic tunnel 116 has exceeded the timeout period provisioned by the dynamic tunnel configuration 218. In this example, the spoke dynamic tunnel manager 120 determines that the period of tunnel inactivity 203 of 31 minutes and 23 seconds exceeds the dynamic tunnel timeout period of 30 minutes indicated by the dynamic tunnel configuration 218. The spoke dynamic tunnel manager 120 terminates the dynamic tunnel 116 by terminating the VPN connection between the spokes 105, 106. For instance, the spoke dynamic tunnel manager 120 can terminate the dynamic tunnel 116 by discarding its shared secret key generated during negotiation of the dynamic tunnel 116 with IKE. As another example, the spoke dynamic tunnel manager 120 can be configured to allow a security association established between the spokes 105, 106 to expire after the dynamic tunnel timeout period has been exceeded. The dynamic tunnel 116 terminates once the security association expires.

At stage C, the spoke dynamic tunnel manager 120 updates the inactivity flag 108 in an entry in the dynamic tunnel table 127 corresponding to the spoke 106 route next hop to indicate that the dynamic tunnel 116 is inactive. The spoke dynamic tunnel manager 120 maintains the VIP address of the spoke 106 as the route next hop for the destination network originally advertised by the spoke 106 in the routing table 102. Because the VIP address of the spoke 106 is maintained in the routing table 102, upon subsequent determination that data is to be sent to the destination network originally advertised by the spoke 106, the spoke dynamic tunnel manager 120 can determine that the route next hop to the destination network for establishing a spoke-to-spoke tunnel already exists. The spoke dynamic tunnel manager 120 can then re-establish a dynamic tunnel between the spokes 105, 106. For instance, a dynamic tunnel can be set up as described in reference to stages D-E in FIG. 1 without necessitating an additional route advertisement by the spoke dynamic tunnel manager 121 and installation of the route to the routing table 102 as described in stages A-C.

Figure 3:
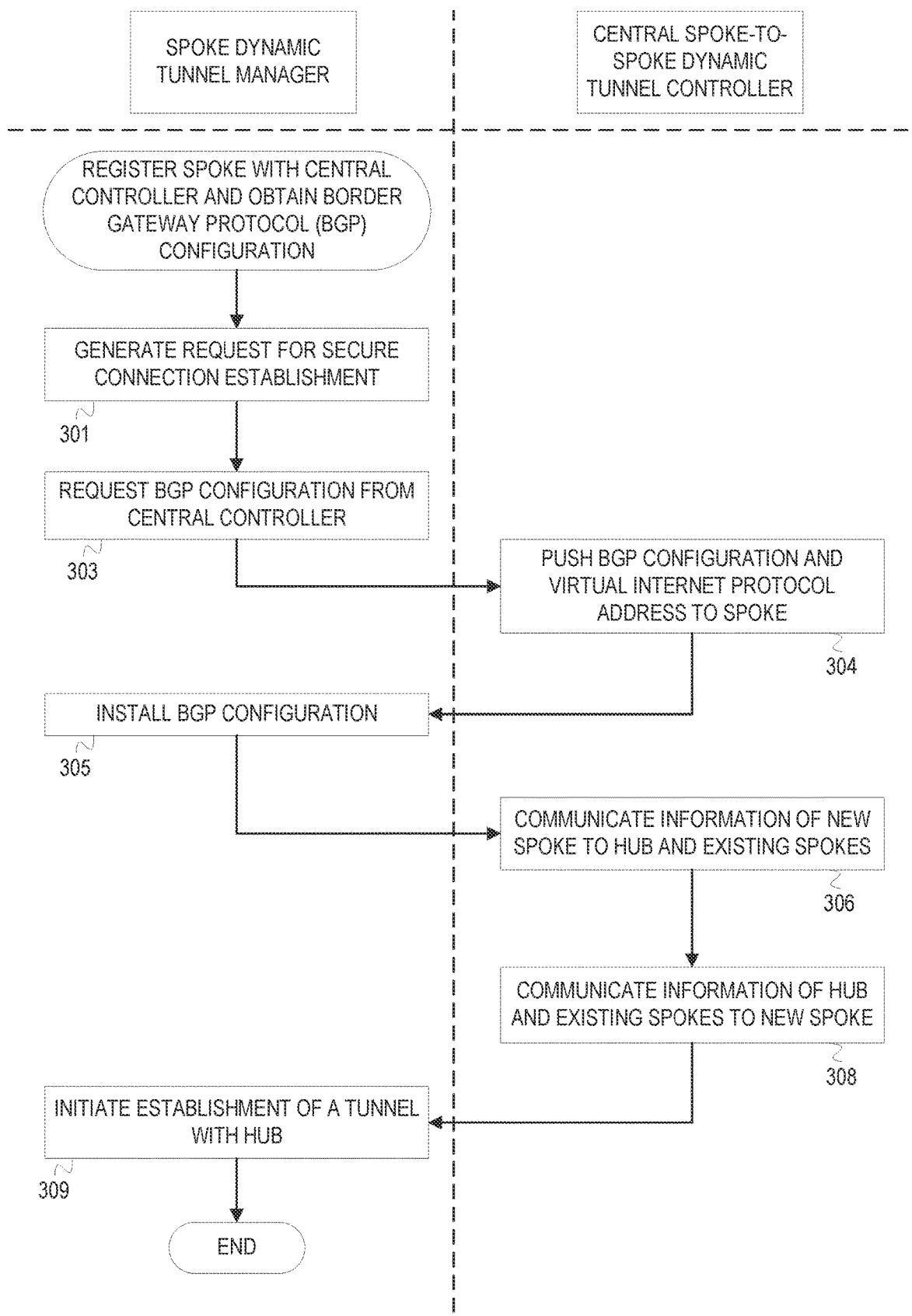
FIG. 3 depicts a flowchart of example operations for registering a spoke with a central spoke-to-spoke dynamic tunnel controller.

FIG. 3 depicts a flowchart of example operations for registering a spoke with a central spoke-to-spoke dynamic tunnel controller. The example operations refer to a central spoke-to-spoke dynamic tunnel controller (or a "central controller") and a spoke dynamic tunnel manager as performing the depicted operations for consistency with FIG. 1 and FIG. 2, though naming of software and program code can vary among implementations. The spoke dynamic tunnel manager executes on a spoke network device in a hub-and-spoke network, which is hereafter referred to as "the instant spoke."

At block 301, the spoke dynamic tunnel manager issues a request to the central controller for establishment of a secure connection. The spoke dynamic tunnel manager can issue the request for secure connection according to any cryptographic protocol for communication security, such as with the SSL or the Transport Layer Security (TLS) protocol. For instance, the spoke dynamic tunnel manager may request a secure session with the central controller by initiating an SSL handshake or a TLS handshake and can negotiate a secure connection with the central controller. Upon completion of the negotiation for a secure connection, such as after an SSL/TLS secured connection is established, the instant spoke can be authenticated to the central controller. The spoke dynamic tunnel manager can send the public IP address of the instant spoke to the central controller once the instant spoke is authenticated. The public IP address may also be communicated to the central controller during negotiation of the secure connection. For example, the spoke dynamic tunnel manager may send the public IP address of the current spoke to the central controller upon initiation of an SSL/TLS handshake.

At block 303, the spoke dynamic tunnel manager requests a BGP configuration from the central controller. The spoke dynamic tunnel manager communicates the request for a BGP configuration upon activation of the instant spoke (e.g., following power-up of the spoke network device). To retrieve the BGP configuration, the spoke dynamic tunnel manager may issue a request to the central controller over the secure communication channel established with the central controller (e.g., the SSL/TLS connection). The spoke dynamic tunnel manager can also issue a request to retrieve a dynamic tunnel configuration from the central controller, such as a get-config request.

At block 304, the central controller pushes a BGP configuration and VIP address to the spoke dynamic tunnel manager. The central controller generates BGP configuration templates and pushes the BGP configuration templates to spokes during registration once the central controller has authenticated the spokes. The BGP configuration template for the instant spoke may be generated upon receipt or in advance of the configuration request. The BGP configuration pushed to the instant spoke may indicate BGP peers and peering policies. The BGP configuration may also include placeholder peer and local addresses for the instant spoke. The central controller may push the BGP configuration to the instant spoke by pushing one or more files which includes the BGP configuration information to the spoke dynamic tunnel manager. The central controller also maintains an address pool which includes pre-defined VIP addresses. A VIP address from this address pool is selected for assignment and communicated to the instant spoke. The BGP configuration and the VIP address may be sent to the spoke dynamic tunnel manager via the secure connection between the central controller and the instant spoke (e.g., an SSL/TLS connection) in one communication or in separate communications.

At block 305, the spoke dynamic tunnel manager installs the BGP configuration to the instant spoke. For instance, the spoke dynamic tunnel manager can execute a script to install the BGP configuration included in configuration files received from the central controller. The BGP configuration installed to the instant spoke can indicate addressing information of a hub with which the spoke should establish BGP peering and other BGP session parameters, the placeholder peer and local addresses, etc. The spoke dynamic tunnel manager can replace the placeholder local address of the instant spoke indicated in the BGP configuration with the VIP address communicated from the central controller.

At block 306, the central controller communicates the VIP and public IP addresses of the instant spoke to the hub and the spokes which have already registered with the central controller. The central controller may send the VIP and public IP address information with the hub and the spokes over secure connections previously established with the hub and each of the spokes. For example, the central controller may encrypt and send the VIP and public IP address data over a connection secured with SSL/TLS previously established with each of the respective network devices.

At block 308, the central controller communicates to the instant spoke the VIP and public IP addresses of the hub and the spokes which have already registered with the central controller. Similar to sharing of VIP and public IP address of the instant spoke with the hub and the other spokes, the central controller may share the previously registered VIP and public IP address information with the instant spoke over the secure connection between the central controller and the instant spoke (i.e., the secure connection established at block 301). For example, the central controller may encrypt and send the VIP and public IP address data over a connection secured with SSL/TLS established with the instant spoke.

At block 309, the spoke dynamic tunnel manager initiates establishment of a VPN tunnel with the hub. The spoke dynamic tunnel manager can replace a placeholder peer address corresponding to the hub with the VIP address of the hub which the central controller communicated to the spoke dynamic tunnel manager. A VPN tunnel can then be negotiated between the instant spoke and the hub based on leveraging the public IP addresses which have been shared with the instant spoke and the hub. For instance, the spoke dynamic tunnel manager can authenticate with the hub and negotiate an IPsec VPN tunnel with the hub. The resulting VPN tunnel which is established is a static VPN tunnel that is not associated with a tunnel timeout period.

Figure 4:
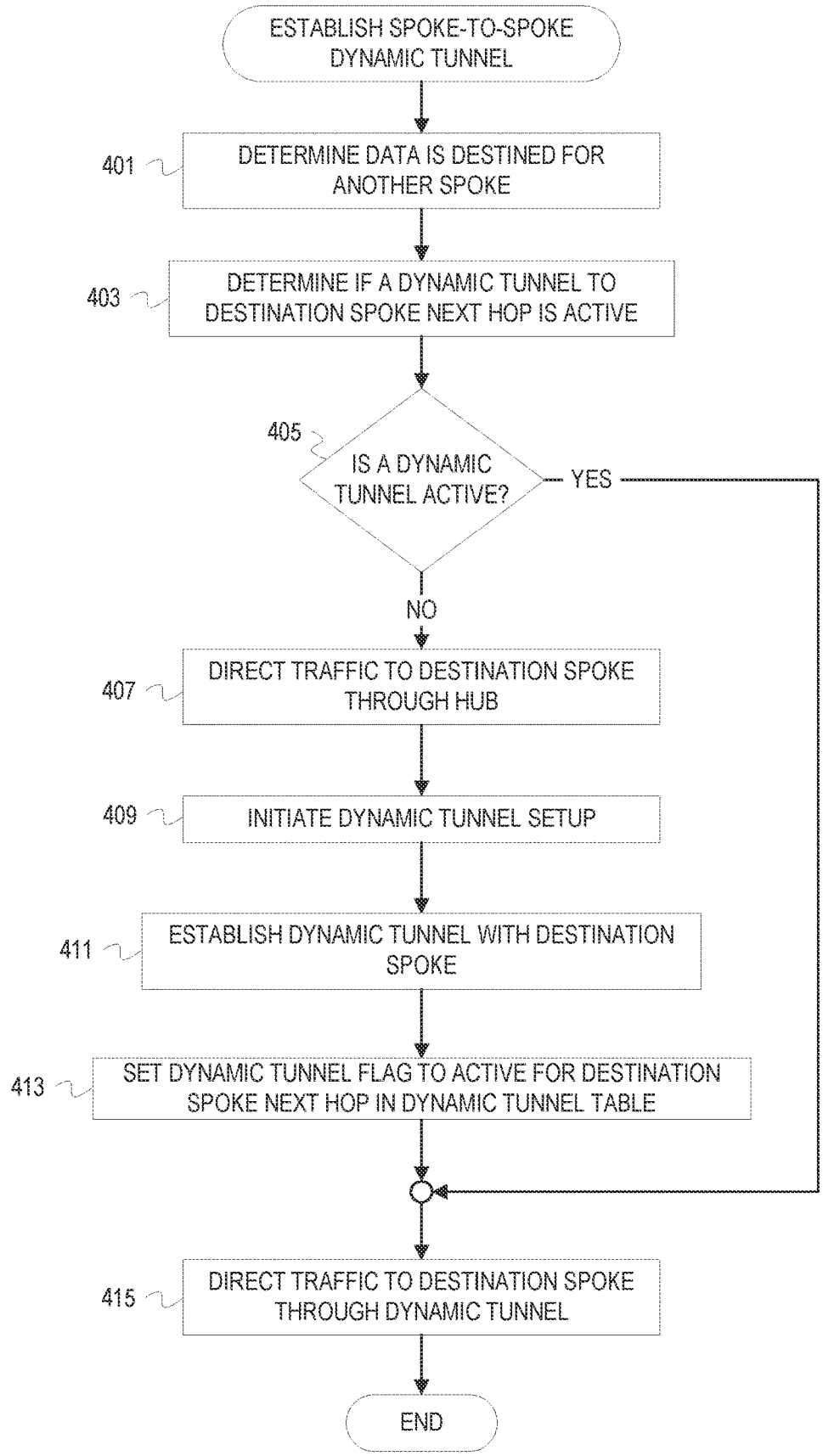
FIG. 4 depicts a flowchart of example operations for dynamic VPN tunnel establishment between spokes.

FIG. 4 depicts a flowchart of example operations for dynamic VPN tunnel establishment between spokes. The example operations refer to a spoke dynamic tunnel manager as performing the depicted operations for consistency with FIG. 1 and FIG. 2, though naming of software and program code can vary among implementations. The spoke dynamic tunnel manager executes on a spoke network device in a hub-and-spoke network, which is hereinafter referred to as the "instant spoke."

At block 401, the spoke dynamic tunnel manager determines that outgoing data (e.g., network packets) are destined for another spoke, or the "destination spoke." The spoke dynamic tunnel manager can determine that network packets are to be sent to another spoke based on the recipient IP address indicated in the header. The spoke dynamic tunnel manager 120 performs a route lookup to find the corresponding route, outgoing interface, and a route next hop. For instance, an entry in a routing table maintained for the instant spoke may indicate a route corresponding to the destination spoke, a spoke VIP address as the route next hop for the destination network of the outgoing data corresponding to the recipient IP address, and an outgoing interface for the destination VIP address. The spoke dynamic tunnel manager can identify this route with the route next hop and outgoing interface as a result of the route lookup.

At block 403, the spoke dynamic tunnel manager determines if a dynamic spoke-to-spoke tunnel between the instant spoke and the destination spoke is active. Multiple tunnels may correspond to the outgoing interface identified as a result of the route lookup, where dynamic spoke-to-spoke tunnels serve as a primary communication channel if such dynamic tunnels between spokes are active. To determine if a dynamic tunnel corresponding to the outgoing tunnel interface is active, the dynamic tunnel manager can search a dynamic tunnel table. The dynamic tunnel table can indicate VIP addresses of route next hops and a flag indicating if a dynamic tunnel to the route next hop is active. For example, a dynamic tunnel table entry for a destination spoke with a VIP address 192.0.2.2 can include the VIP address 192.0.2.2 as the route next hop and a flag field indicating whether network traffic can be routed directly to the destination spoke through a dynamic tunnel. The flag included in the flag field may be an activity flag which is set based on whether a dynamic tunnel to the destination spoke route next hop is currently active (e.g., TUNNEL_ACTIVE or TUNNEL_INACTIVE), an inactivity flag which is replaced with a tunnel interface identifier when a dynamic tunnel becomes active, etc.

At block 405, the spoke dynamic tunnel manager determines if a dynamic tunnel is active. The spoke dynamic tunnel manager can determine if a dynamic tunnel is active based on the dynamic tunnel activity flag in the dynamic tunnel table entry for the VIP address indicated as the route next hop. For example, the spoke dynamic tunnel manager may determine that an inactivity flag is present in the dynamic tunnel table entry for the spoke VIP address set as the route next hop. As an alternative example, the spoke dynamic tunnel manager may identify a tunnel interface indicating that a dynamic tunnel corresponding to the outgoing interface is active rather than an inactivity flag in the routing table entry. If a dynamic tunnel is not active, operations continue at block 407. If a dynamic tunnel is active, operations continue at block 415.

At block 407, the spoke dynamic tunnel manager routes network traffic to the destination spoke via the hub through static VPN tunnels. The spoke dynamic tunnel manager can maintain the VIP address of the hub through which network traffic can be routed for the destination route in addition to the VIP address of the destination spoke as the route next hop. The spoke dynamic tunnel manager may store the VIP address of the hub in the dynamic tunnel table, in the routing table, or in another data structure which is indicated by an entry in the dynamic tunnel table or routing table (e.g., by a pointer to the data structure). The spoke dynamic tunnel manager can retrieve the information for a static VPN tunnel over which the network traffic should be sent based on the VIP address of the hub. Based on identifying a static VPN tunnel corresponding to the outgoing interface, the spoke dynamic tunnel manager can route the network traffic through the static VPN tunnel to the hub as a secondary communication channel during dynamic tunnel setup. Data transmitted from the destination spoke to the instant spoke in response is also routed through the respective static VPN tunnels established with the hub. Temporary routing of network traffic between spokes via the hub prevents data loss during dynamic tunnel setup.

At block 409, the spoke dynamic tunnel manager initiates dynamic tunnel setup. The spoke dynamic tunnel manager can initiate and complete dynamic tunnel setup in parallel with routing of network traffic through the hub. For example, with reference to FIG. 1, while network traffic communicated between the spokes 105, 106 is sent through the static tunnels 110B-C via the hub 104, negotiation of the dynamic tunnel 116 between the spokes 105, 106 can be initiated. Dynamic tunnel setup can be initiated according to the IKE protocol. The spoke dynamic tunnel manager authenticates with the destination spoke. The spoke dynamic tunnel manager can authenticate with the destination spoke with certificate-based authentication or password-based authentication. For example, the spoke dynamic tunnel manager and destination spoke may authenticate with PKI certificates issued to the instant and destination spokes by a central spoke-to-spoke dynamic tunnel controller acting as a certificate authority.

At block 411, the spoke dynamic tunnel manager establishes a dynamic tunnel between the instant spoke and the destination spoke. The spoke dynamic tunnel manager may establish a secure channel between the instant spoke and the destination spoke according to IKE Phase 1. In IKE Phase 1, after the instant spoke and the destination spoke authenticate, the spoke dynamic tunnel manager generates a private key. The destination spoke also generates a private key. The spoke dynamic tunnel manager exchanges a public key of the instant spoke with a public key of the destination spoke. For example, the spoke dynamic tunnel manager can complete a Diffie-Hellman key exchange with the destination spoke. After exchanging keys, the spoke dynamic tunnel manager can generate a shared secret key based on the key exchange. Similarly, the destination spoke also generates a shared secret key. The spoke dynamic tunnel manager can leverage the shared secret keys to further secure the channel between the instant and destination spokes, such as according to IKE Phase 2. For instance, the dynamic tunnel manager can use the shared secret keys to set up dynamic tunnel encryption with IPsec. Once dynamic tunnel negotiation is completed, a VPN tunnel is available for bidirectional communication of data between the instant spoke and the destination spoke.

At block 413, the spoke dynamic tunnel manager updates a dynamic tunnel flag field in the corresponding dynamic tunnel table entry to indicate that a dynamic tunnel between the instant spoke and the destination spoke is active. When the dynamic tunnel has been established, the spoke dynamic tunnel manager replaces the tunnel inactivity flag with an indicator that the dynamic tunnel is active. For instance, the tunnel inactivity flag can be replaced with a flag indicating that the dynamic tunnel is active. As another example, the inactivity flag can be replaced with an identifier for a tunnel interface for the dynamic tunnel.

At block 415, the spoke dynamic tunnel manager directs network traffic to the destination spoke through the dynamic tunnel. Data which was temporarily routed between spokes via the hub through static VPN tunnels is redirected to flow through the dynamic tunnel and no longer flows through the static VPN tunnels established with the hub.

Figure 5:
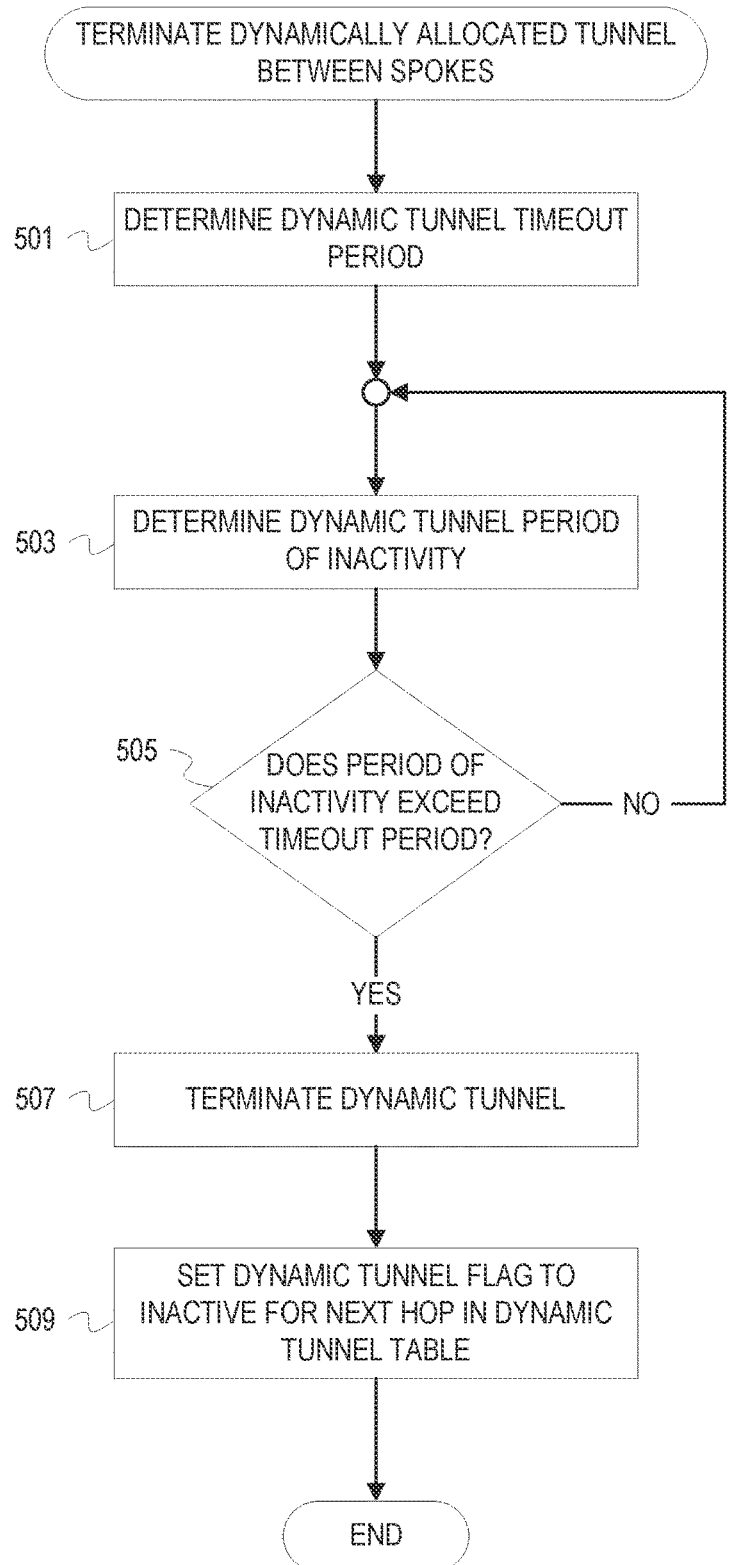
FIG. 5 depicts a flowchart of example operations for termination of dynamically established VPN tunnels between spokes.

FIG. 5 depicts a flowchart of example operations for termination of dynamically established VPN tunnels between spokes. The example operations can occur after a spoke-to-spoke VPN tunnel has been dynamically established between spokes. The example operations refer to a spoke dynamic tunnel manager as performing the depicted operations for consistency with FIG. 1 and FIG. 2, though naming of software and program code can vary among implementations. The example operations refer to the dynamic tunnel manager as executing on an instant spoke.

At block 501, the spoke dynamic tunnel manager determines a dynamic tunnel timeout period. The dynamic tunnel timeout period corresponds to a maximum period of time during which no data is sent over the dynamic tunnel which is permitted before initiating dynamic tunnel teardown. The spoke dynamic tunnel manager can be configured to enforce an idle timeout period for VPN tunnels. A dynamic tunnel configuration installed on the instant spoke may also indicate a timeout period for VPN tunnels.

At block 503, the spoke dynamic tunnel manager determines a dynamic tunnel period of inactivity. The dynamic tunnel period of inactivity corresponds to the elapsed time since data was last sent or received over the dynamic tunnel. The spoke dynamic tunnel manager may determine the period of inactivity based on records indicating a time stamp associated with the most recent incoming or outgoing network packet (e.g., in a network log). For example, if the most recent entry in a network log indicates the instant spoke sent a packet to a destination spoke over the dynamic tunnel on Jul. 17, 2019 at 03:35:14 and the current time is determined to be Jul. 17, 2019 at 03:50:55, the period of inactivity can be determined to be 15 minutes and 41 seconds.

At block 505, the spoke dynamic tunnel manager determines if the period of inactivity exceeds the timeout period. For example, the dynamic tunnel manager may enforce a dynamic tunnel timeout period of 15 minutes. The dynamic tunnel manager can compare the observed period of inactivity with the timeout period to determine whether it exceeds the 15-minute timeout period. If the period of inactivity does not exceed the timeout period, operations continue at block 503. If the period of inactivity exceeds the timeout period, operations continue at block 507.

At block 507, the spoke dynamic tunnel manager terminates the dynamic tunnel. The dynamic tunnel can be terminated by disconnecting the VPN connection between the instant spoke and the destination spoke. For example, if the dynamic tunnel is an IPsec tunnel, the dynamic tunnel many be terminated by disconnecting the IPsec session.

At block 509, the spoke dynamic tunnel manager sets a dynamic tunnel flag to inactive in a dynamic tunnel table entry in a dynamic tunnel table maintained for the instant spoke. A dynamic tunnel table entry indicating the VIP address of the destination spoke as the route next hop can include a field for an indicator of dynamic tunnel activity. The spoke dynamic tunnel manager updates the tunnel activity field in the dynamic tunnel table to indicate that the dynamic tunnel between the instant spoke and the destination spoke is inactive. For example, the field may be updated with a tunnel inactivity flag (e.g., a TUNNEL_INACTIVE flag). As another example, a tunnel interface identifier corresponding to the dynamic tunnel may be set to null.

Variations

Though not depicted in FIGS. 1 and 2, spokes may be disconnected from the central controller 101. For instance, the spoke 103 may power down or exceed an allotted period of time to reconnect to the central controller 101 after "refreshing" its secure connection with the central controller 101. If the central controller 101 determines that the spoke 103 has powered down or has exceeded the allotted reconnection time, the central controller 101 can return the VIP address which was allocated to the spoke 103 to the address pool 111. For example, the central controller 101 may return the VIP address 192.0.2.3 which was initially assigned to the spoke 103 to the address pool 111. The central controller 101 can subsequently assign this VIP address to a new spoke which registers with the central controller 101. If the spoke 103 later re-establishes the secure connection with the central controller 101, the central controller 101 allocates a new VIP address from the address pool 111 to the spoke 103. The central controller 101 then notifies other spokes of the new VIP address of the spoke 103.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 306 and 308 in FIG. 3 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
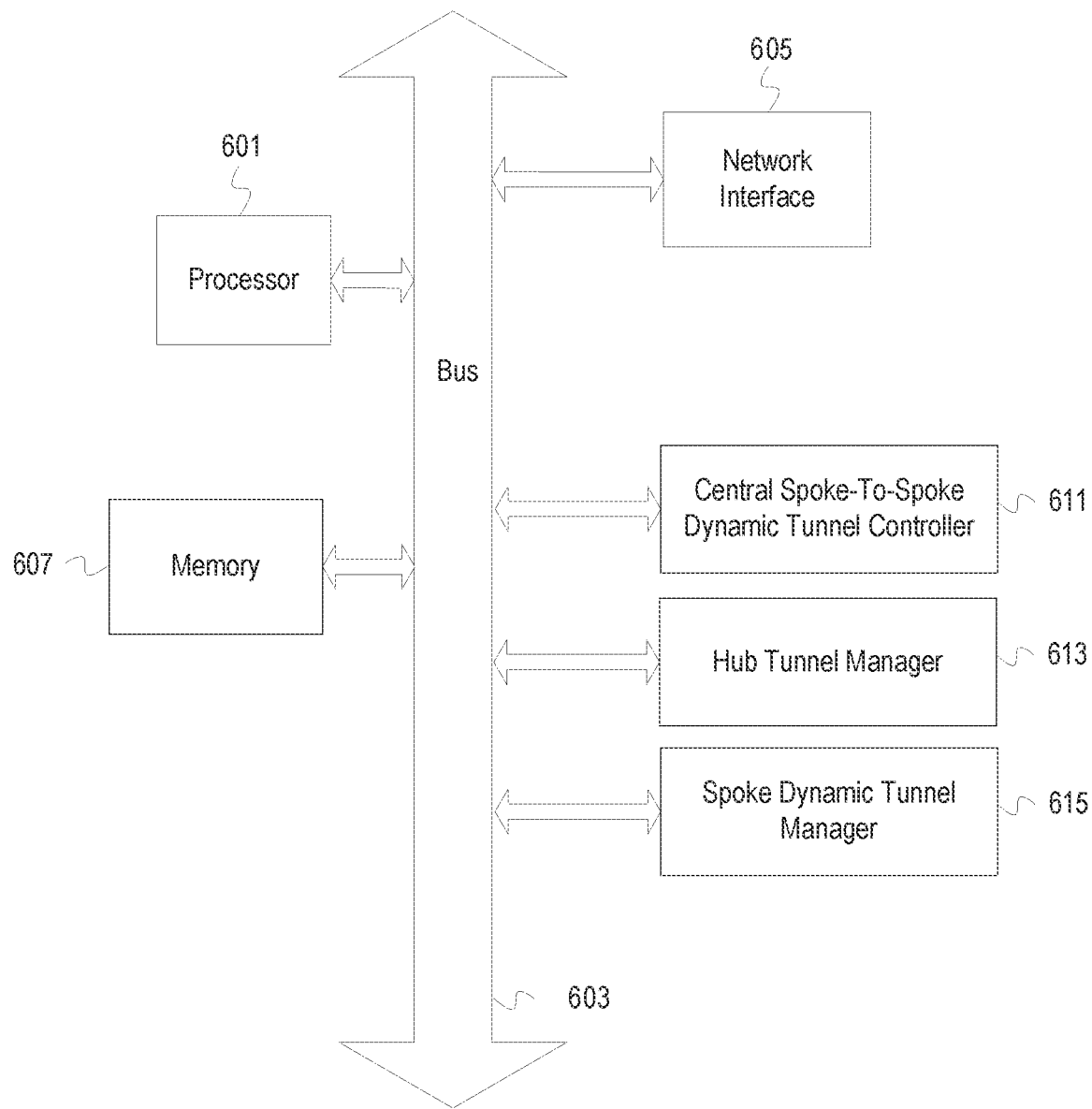
FIG. 6 depicts an example computer system with a central spoke-to-spoke dynamic tunnel controller, a hub tunnel manager, and a spoke dynamic tunnel manager.

FIG. 6 depicts an example computer system with a central spoke-to-spoke dynamic tunnel controller, a hub tunnel manager, and a spoke dynamic tunnel manager. The computer system includes a processor 601 (possibly including multiple processors, multiple cores, multiple nodes, and/or implementing multi-threading, etc.). The computer system includes memory 606. The memory 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes central spoke-to-spoke dynamic tunnel controller 611, a hub tunnel manager 613, and a spoke dynamic tunnel manager 615. The central spoke-to-spoke dynamic tunnel controller 611 generates BGP configuration templates which are pushed to network devices and communicates addressing information with network devices in a hub-and-spoke network. The hub tunnel manager 613 maintains VIP and public IP address information of spokes registered with the central spoke-to-spoke dynamic tunnel controller 611 to facilitate establishment of tunnels between newly registered spokes and a hub network device. The spoke dynamic tunnel manager 615 manages establishment of dynamic VPN tunnels between spokes and termination of the dynamic VPN tunnels after tunnel timeout. The central spoke-to-spoke dynamic tunnel controller 611, hub tunnel manager 613, and spoke dynamic tunnel manager 615 are not necessarily installed on the same device. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 606 may be coupled to the processor 601.

While the aspects of the disclosure are described with reference to various implementations and exploitations, it will be understood that these aspects are illustrative and that the scope of the claims is not limited to them. In general, techniques for leveraging BGP for dynamic establishment of spoke-to-spoke VPN tunnels as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
based on a first spoke network device detecting network traffic that is destined for a destination network, determining that the destination network corresponds to a second spoke network device;
determining that a dynamic tunnel can be established between the first spoke network device and the second spoke network device for a route to the destination network having a virtual Internet Protocol (IP) address of the second spoke network device as a next hop;
establishing the dynamic tunnel between the first and second spoke network devices and directing flow of the network traffic from the first spoke network device to the second spoke network device via a hub network device during establishment of the dynamic tunnel;
indicating that the dynamic tunnel for the route with the virtual IP address of the second spoke network device as the next hop is active; and
redirecting the flow of the network traffic over the dynamic tunnel based on the indication of the dynamic tunnel as active.

2. The method of claim 1 further comprising maintaining, by the first spoke network device, a data structure with entries comprising dynamic tunnel information, wherein each of the entries of the data structure comprise a virtual IP address of a route next hop and an indication of whether a dynamic tunnel to the route next hop is active.

3. The method of claim 2, wherein determining that the dynamic tunnel can be established comprises performing a lookup in the data structure with the virtual IP address of the second spoke network device and determining that a corresponding one of the entries indicates that the dynamic tunnel to the second spoke network device is not active.

4. The method of claim 2, wherein indicating that the dynamic tunnel is active comprises updating one of the entries corresponding to the virtual IP address of the second spoke network device with an indication that the dynamic tunnel is active.

5. The method of claim 1, wherein determining that the destination network corresponds to a second spoke network device comprises performing a lookup for the route from the first spoke network device to the destination network based on a destination IP address of the network traffic and identifying the virtual IP address of the second spoke network device as the next hop for the route.

6. The method of claim 5, wherein the virtual IP address was dynamically assigned to the second spoke network device from an address pool of virtual IP addresses.

7. The method of claim 1, wherein directing the flow of the network traffic from the first spoke network device to the second spoke network device via the hub network device comprises directing the flow of the network traffic over static tunnels previously established between the first and second spoke network devices and the hub network device, wherein the direction of the network traffic over the static tunnels and establishment of the dynamic tunnel are at least partially concurrent.

8. The method of claim 1 further comprising the first spoke network device obtaining a Border Gateway Protocol (BGP) configuration and an additional virtual IP address that was allocated to the first spoke network device and installing the BGP configuration, wherein the BGP configuration indicates BGP peers of the first spoke network device and placeholder local and peer addresses for the first spoke network device.

9. The method of claim 8 further comprising:
replacing the placeholder local address for the first spoke network device with the additional virtual IP address based on installing the BGP configuration; and based on communication of one or more other virtual IP addresses of one or more of the BGP peers to the first spoke network device, replacing corresponding ones of the placeholder peer addresses with the one or more other virtual IP addresses, wherein the one or more other virtual IP addresses comprise the virtual IP address of the second spoke network device.

10. The method of claim 1, wherein the dynamic tunnel is a virtual private network (VPN) tunnel, and wherein establishing the dynamic tunnel comprises establishing the VPN tunnel with Internet Key Exchange (IKE).

11. One or more non-transitory computer-readable media having program code for a first spoke network device to establish dynamic tunnels with other spoke network devices stored thereon, the program code comprising instructions to:
based on detection of outbound network traffic, determine that a destination network of the outbound network traffic corresponds to a second spoke network device;
determine whether a dynamic tunnel can be established to the second spoke network device for a route to the destination network having a virtual Internet Protocol (IP) address of the second spoke network device as a next hop;
based on a determination that the dynamic tunnel can be established, establish the dynamic tunnel with the second spoke network device and direct flow of the outbound network traffic to the second spoke network device via a hub network device during setup of the dynamic tunnel;
indicate that the dynamic tunnel for the route with the virtual IP address of the second spoke network device as the next hop is active; and
redirect the flow of network traffic sent between the first and second spoke network devices over the dynamic tunnel based on the indication of the dynamic tunnel as active.

12. The non-transitory computer-readable media of claim 11, wherein the program code further comprises instructions to maintain a data structure comprising one or more entries, wherein each of the entries indicates a virtual IP address of another spoke network device and whether a dynamic tunnel to the another spoke network device is active.

13. The non-transitory computer-readable media of claim 12, wherein the instructions to determine whether the dynamic tunnel can be established comprise instructions to search the data structure for the virtual IP address of the second spoke network device and determine whether the corresponding one of the entries indicates that the dynamic tunnel is active.

14. The non-transitory computer-readable media of claim 11, wherein the instructions to determine that the destination network of the outbound network traffic corresponds to the second spoke network device comprise instructions to perform a route lookup for the destination network based on a destination IP address of the outbound network traffic and identify the virtual IP address of the second spoke network device as the next hop for the route, wherein the virtual IP address was previously allocated to the second spoke network device from an address pool of virtual IP addresses.

15. The non-transitory computer-readable media of claim 11, wherein the program code further comprises instructions to:
obtain a Border Gateway Protocol (BGP) configuration and an additional virtual IP address, wherein the BGP configuration indicates BGP peering information and placeholder local and peer addresses;
replace the placeholder local address with the additional virtual IP address based on installation of the BGP configuration; and
based on receipt of other virtual IP addresses of BGP peers, replace corresponding ones of the placeholder peer addresses with the other virtual IP addresses, wherein the other virtual IP addresses comprise the virtual IP address of the second spoke network device.

16. A network device comprising:
a processor; and
a computer-readable medium having instructions stored thereon that are executable by the processor to cause the network device to,
based on detection of an outbound packet, determine that a destination of the outbound packet corresponds to a spoke network device;
determine, based on a virtual Internet Protocol (IP) address of the spoke network device, that a dynamic tunnel can be established to the spoke network device for a route to the destination of the outbound packet having a virtual Internet Protocol (IP) address of the spoke network device as a next hop;
establish the dynamic tunnel with the spoke network device and direct the outbound packet to the spoke network device via a hub network device, wherein at least part of establishment of the dynamic tunnel and direction of the outbound packet to the spoke network device via the hub network device occur concurrently;
indicate that the dynamic tunnel for the route with the virtual IP address of the spoke network device as the next hop is active; and
redirect subsequent packets over the dynamic tunnel based on the indication of the dynamic tunnel as active.

17. The network device of claim 16, wherein the instructions executable by the processor to cause the network device to determine that the destination of the outbound packet corresponds to a spoke network device comprise instructions executable by the processor to cause the network device to perform a route lookup for the destination of the outbound packet based on a destination IP address of the outbound packet and identify the virtual IP address of the spoke network device as a route next hop, wherein the virtual IP address was previously allocated to the spoke network device.

18. The network device of claim 16 further comprising instructions executable by the processor to cause the network device to maintain a data structure comprising one or more entries, wherein each of the entries indicates a virtual IP address of another spoke network device and whether a dynamic tunnel to the another spoke network device is active, and wherein the instructions executable by the processor to cause the network device to determine that the dynamic tunnel can be established to the spoke network device comprise instructions executable by the processor to cause the network device to search the data structure for the virtual IP address of the spoke network device and determine that the corresponding one of the entries indicates that the dynamic tunnel is not active.

19. The network device of claim 16 further comprising instructions executable by the processor to cause the network device to:
obtain a Border Gateway Protocol (BGP) configuration and an additional virtual IP address, wherein the BGP configuration indicates BGP peers of the network device and placeholder local and peer addresses for the network device; and based on installation of the BGP configuration, replace the placeholder local address with the additional virtual IP address.

20. The network device of claim 19 further comprising instructions executable by the processor to cause the network device to:

based on receipt of one or more other virtual IP addresses of one or more of the BGP peers that were communicated to the network device, replace corresponding ones of the placeholder peer addresses with the one or more other virtual IP addresses, wherein the one or more other virtual IP addresses comprise the virtual IP address of the spoke network device.

* * * * *